(12) United States Patent
Gehring et al.

(10) Patent No.: US 7,997,964 B2
(45) Date of Patent: Aug. 16, 2011

(54) AIR VENT PROVIDING DIFFUSION

(75) Inventors: Thomas F. Gehring, Toronto (CA); Matthew G. Thornback, Kitchener (CA); Farhan Sultan, Mississauga (CA)

(73) Assignee: International Automotive Components Group North America, Inc., Dearborn, MI (US)

( * ) Notice: Subject to any disclaimer, the term of this patent is extended or adjusted under 35 U.S.C. 154(b) by 170 days.

(21) Appl. No.: 12/360,733

(22) Filed: Jan. 27, 2009
(Under 37 CFR 1.47)

(65) Prior Publication Data
US 2010/0120347 A1    May 13, 2010

Related U.S. Application Data

(63) Continuation of application No. PCT/US2007/074583, filed on Jul. 27, 2007.

(60) Provisional application No. 60/833,758, filed on Jul. 27, 2006.

(51) Int. Cl.
  B60H 1/34   (2006.01)
  F24F 13/14  (2006.01)
  F24F 13/15  (2006.01)
(52) U.S. Cl. ........... 454/155; 454/69; 454/152; 454/284
(58) Field of Classification Search .................. 454/69, 454/152, 155, 284
See application file for complete search history.

(56) References Cited

U.S. PATENT DOCUMENTS

| | | | |
|---|---|---|---|
| 1,804,165 A | 5/1931 | Holub | |
| 2,158,413 A * | 5/1939 | Feinberg | 454/315 |
| 2,887,943 A | 5/1959 | Goettl | |
| 5,036,753 A | 8/1991 | Ostrand et al. | |
| 5,063,833 A | 11/1991 | Hara et al. | |
| 5,080,002 A | 1/1992 | Soethout et al. | |
| 5,470,276 A | 11/1995 | Burnell et al. | |
| 5,591,079 A | 1/1997 | Saida et al. | |
| 5,660,588 A | 8/1997 | Kotch et al. | |
| 5,690,550 A | 11/1997 | Mikowski | |
| 6,340,328 B1 | 1/2002 | Schwandt et al. | |
| 6,652,371 B2 | 11/2003 | Kamio | |

(Continued)

FOREIGN PATENT DOCUMENTS

EP    1270286 A2    1/2003

(Continued)

OTHER PUBLICATIONS

EPO Search report issued Mar. 19, 2010 in related European Application No. EP 07813465.7 (5 pages).

(Continued)

*Primary Examiner* — Steven B McAllister
*Assistant Examiner* — Phillip E Decker
(74) *Attorney, Agent, or Firm* — Grossman, Tucker, Perreault & Pfleger, PLLC

(57) ABSTRACT

An adjustable air vent assembly has a frame and a plurality of louvers pivotally mounted to the frame. The plurality of louvers is movable between a closed position and a diffuse position. In the closed position, each louver has an edge contacting an edge of at least one other louver to substantially prevent air from flowing through the plurality of louvers in the closed position. In the diffuse position a first louver is oriented along a non-parallel plane with respect to a second louver. A single actuator is provided for moving the plurality of louvers between the closed and diffuse positions.

7 Claims, 12 Drawing Sheets

U.S. PATENT DOCUMENTS

| | | |
|---|---|---|
| 6,800,023 B2 | 10/2004 | Demerath |
| 6,863,603 B2 | 3/2005 | Demerath |
| 7,604,533 B2 * | 10/2009 | Ogura et al. ............... 454/155 |
| 2002/0094774 A1 | 7/2002 | Demerath |
| 2002/0111131 A1 | 8/2002 | Demerath |
| 2003/0022616 A1 | 1/2003 | Stiehl |
| 2004/0002298 A1 | 1/2004 | Osada et al. |
| 2004/0127153 A1 | 7/2004 | Demerath |
| 2005/0030234 A1 | 2/2005 | Lauhoff |
| 2005/0042982 A1 | 2/2005 | Okada et al. |
| 2005/0239391 A1 * | 10/2005 | Shibata ............... 454/155 |
| 2006/0052046 A1 | 3/2006 | Krause et al. |
| 2006/0057952 A1 | 3/2006 | Kim |
| 2006/0063480 A1 | 3/2006 | Neumann et al. |
| 2006/0073781 A1 * | 4/2006 | Mochizuki et al. ......... 454/152 |
| 2006/0172679 A1 * | 8/2006 | Gehring et al. ............ 454/152 |
| 2006/0172681 A1 | 8/2006 | Steinbeiss |
| 2007/0111652 A1 | 5/2007 | Klingler et al. |
| 2007/0232216 A1 * | 10/2007 | Shibata ............... 454/155 |

FOREIGN PATENT DOCUMENTS

| | | |
|---|---|---|
| FR | 2864807 A1 | 7/2005 |
| JP | 6186529 | 7/1994 |
| JP | 2002293133 | 10/2002 |
| JP | 2004034776 | 2/2004 |
| JP | 2005041291 | 2/2005 |

OTHER PUBLICATIONS

International Search Report and Written Opinion dated Sep. 12, 2008 issued in related International Patent Application No. PCT/US07/74583.

* cited by examiner

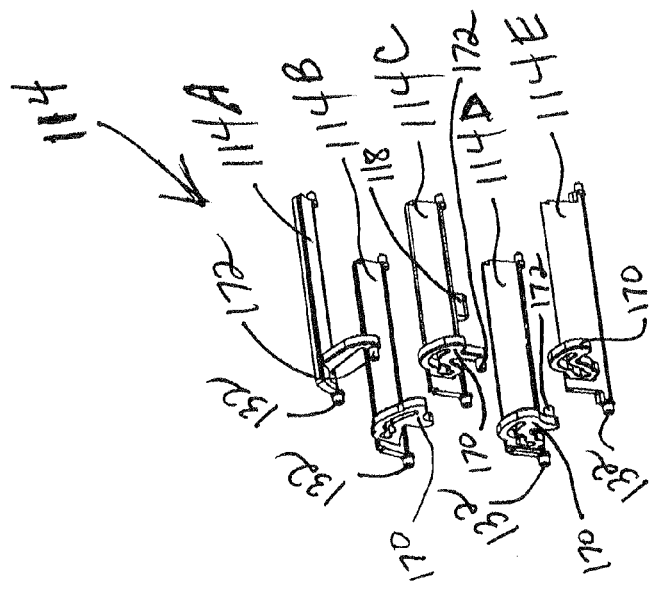

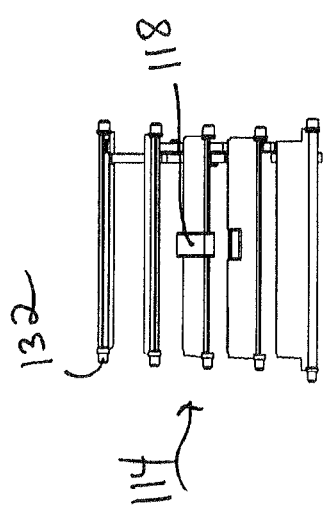
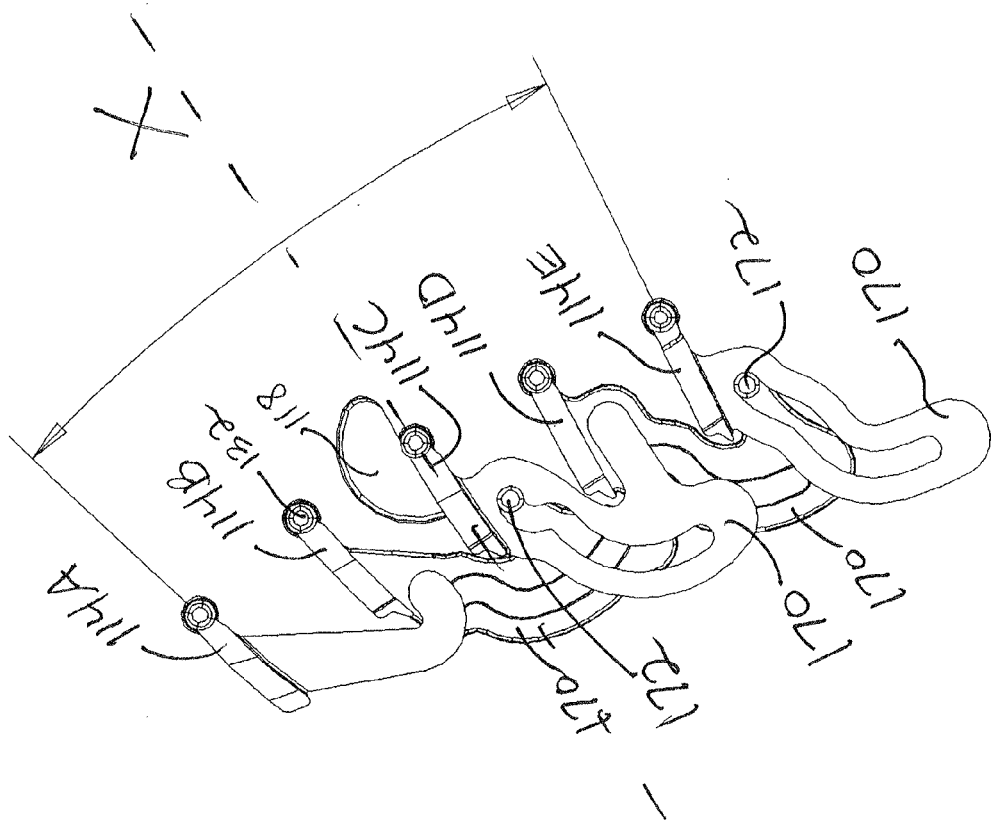
Figure 15a
Figure 15b ns.google.com/patents/US7997964
AIR VENT PROVIDING DIFFUSION

CROSS-REFERENCE TO RELATED APPLICATIONS

This application is a continuation of International Application No. PCT/US2007/074583 filed Jul. 27, 2007 and published Jan. 31, 2008 as WO 2008/014451, entitled "AIR VENT PROVIDING DIFFUSION," designating the United States, and which claims the benefit of U.S. Provisional Application Ser. No. 60/833,758 filed on Jul. 27, 2006, entitled "AIR VENT PROVIDING DIFFUSION," the entire contents of which are incorporated herein by reference.

BACKGROUND OF THE INVENTION

1. Field of the Invention

The present invention generally relates to an air vent. More particularly, the invention relates to an air vent for use in a motor vehicle, having a plurality of pivotally arranged louvers.

2. Description of Related Art

Motor vehicles typically include heating/cooling vents located on an instrument panel to direct conditioned air toward occupants of the vehicle. These vents typically may be controlled by occupants that are seated near them. Conditioned air that is forced out of the vents may be directed by moving levers to shift louvers, or vanes, located at the outlet ends, either sideward, upward or downward. Often, the louvers may be completely closed by the occupant to block air from reaching the occupant. Generally, the louvers are configured to operate in a parallel mode, wherein the louvers are aligned and move together such that they remain parallel to each other even as they pivot.

Another type of air vent that has been used within motor vehicles is a diffuse air vent. This type of air vent has louvers, which may be fixed or pivotal, that are spread outwardly from one another to direct air in multiple directions. These types of air vents are typically located in spaces where their benefits will reach more than one occupant, without directing too much air to a single occupant; for example, diffuse air vents may be located on top of an instrument panel or on the rear side of a center console.

It may be desirable to have both a diffuse air system for conditioning of air in a vehicle as a whole, while also providing typical instrument panel registers so that occupant's can directly control the conditioned air emanating therefrom. However, multiple air vent systems add complications to the design and cost of vehicle heating, ventilation and air conditioning (HVAC) systems. There is a trade off between providing passengers with a high level of comfort while keeping vehicle components simple to provide transportation in an affordable price range.

BRIEF SUMMARY OF THE INVENTION

The present invention provides an adjustable air vent assembly capable of functioning as both a typical instrument panel/dash air vent, as well as a diffusion air vent. The adjustable air vent assembly has a frame and a plurality of louvers pivotally mounted to the frame. The plurality of louvers is movable between a closed position and a diffuse position. In the closed position, each louver of the plurality of louvers has an edge contacting an edge of at least one other louver of the plurality of louvers to substantially prevent air from flowing through the plurality of louvers. In the diffuse position, a first louver of the plurality of louvers is oriented along a non-parallel plane with respect to a second louver of the plurality of louvers. A single actuator is coupled to the plurality of louvers for moving the plurality of louvers between the closed and diffuse positions.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 10 is perspective view of another adjustable air vent assembly embodying the principles of the present invention;

FIG. 11 is a side view of the adjustable air vent assembly of FIG. 10;

FIG. 12 is an exploded view of portions of the adjustable air vent assembly of FIGS. 10-11;

FIG. 15a is a perspective view of portions of the adjustable air vent assembly of FIGS. 10-14b, showing the plurality of louvers in a fully open, diffuse position; and FIG. 15b is a side view of portions of the adjustable air vent assembly of FIGS. 10-15a, also showing the plurality of louvers in the fully open, diffuse position.

DETAILED DESCRIPTION OF THE INVENTION

Figure 1:
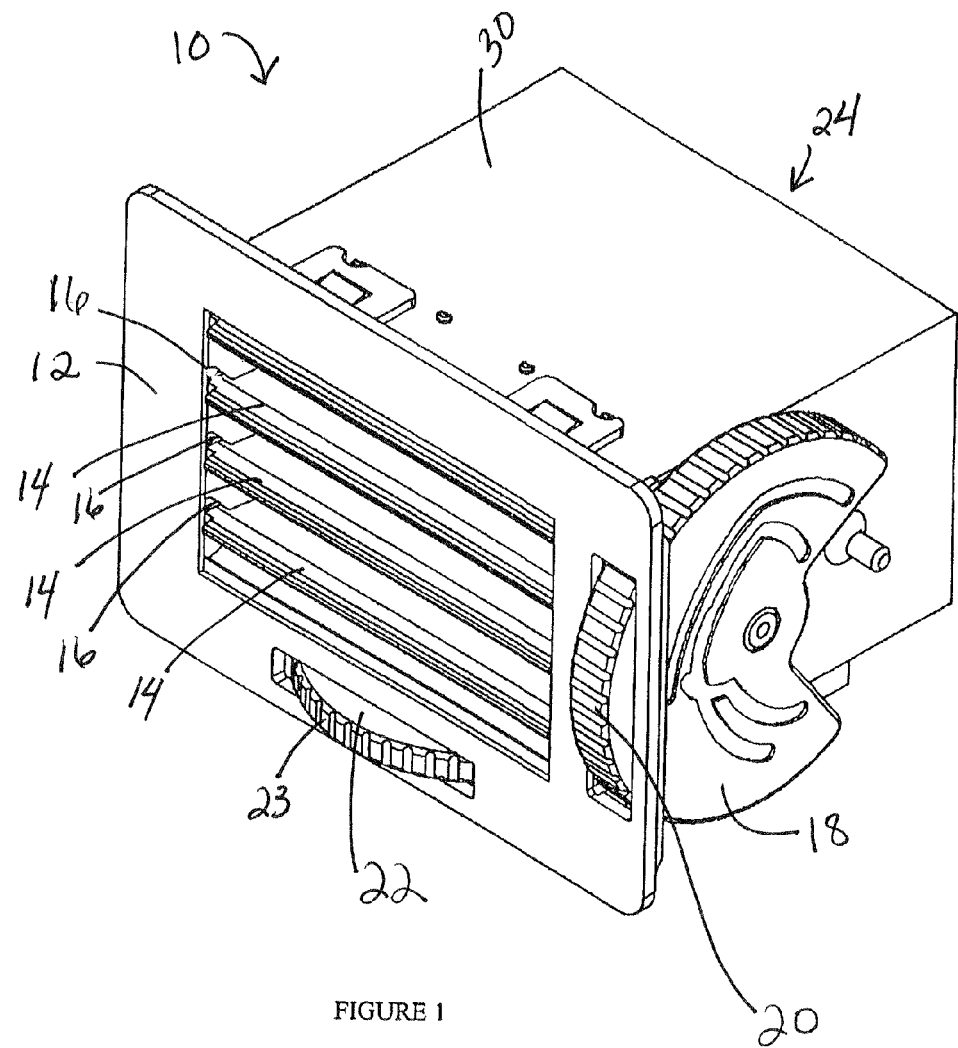
FIG. 1 is a perspective view of an adjustable air vent assembly embodying the principles of the present invention.
Figure 2:
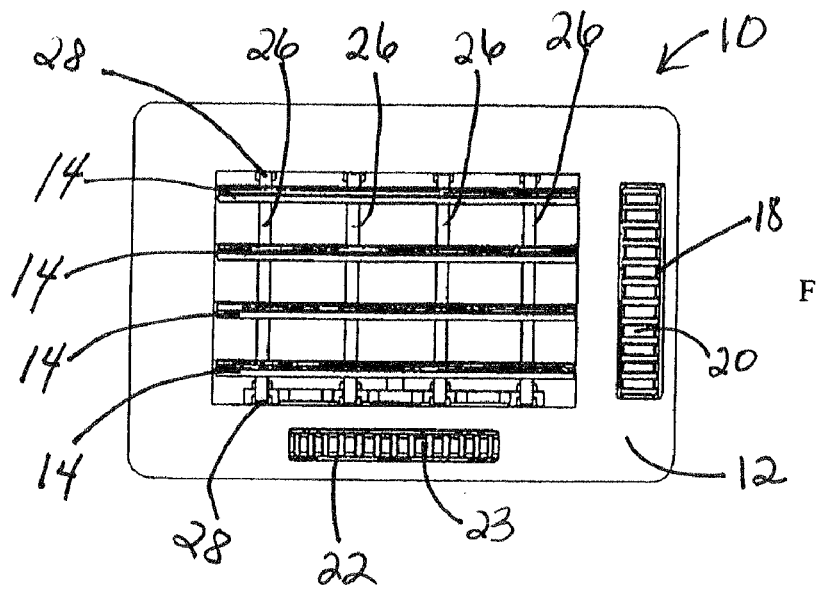
FIG. 2 is a front view of the adjustable air vent assembly of FIG. 1.
Figure 3:
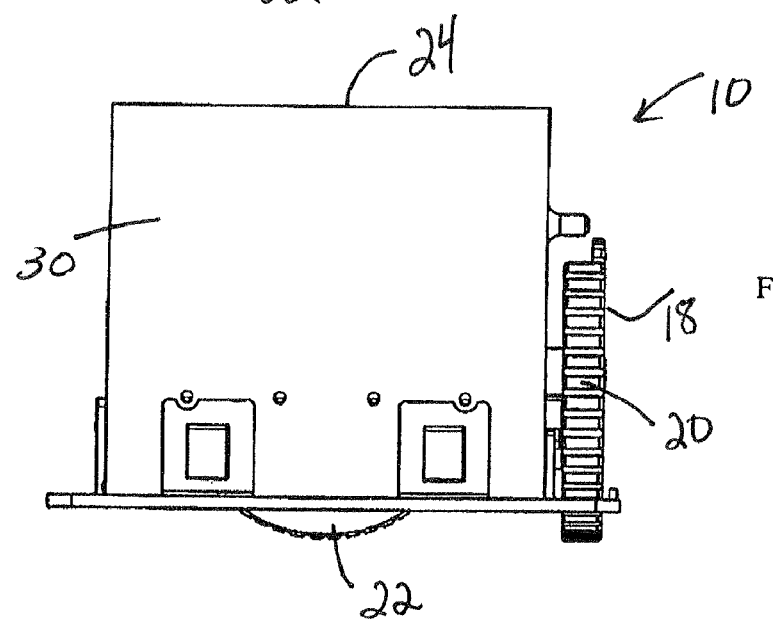
FIG. 3 is a top view of the adjustable air vent assembly of FIGS. 1 and 2.

The present invention generally provides an integrated air vent that is capable of functioning as both a traditional register-type air vent and a diffuse air vent. Referring now to FIGS. 1-3, an adjustable air vent assembly is illustrated and designated generally at 10. The adjustable air vent assembly 10 includes a frame 12 and a plurality of louvers 14, which are pivotally mounted onto the frame 12 at pivot points 16. The louvers 14 are located on the front of the air vent assembly 10 and extend horizontally. It should be understood, however, that the louvers 14 could extend in any suitable direction without falling beyond the spirit and scope of the present invention.

The louvers 14 are coupled to a single actuator, such as a control wheel 18 or thumbwheel. The control wheel 18 operates to move the louvers 14 between a closed position, an open position, and a diffuse position, which will be described in further detail below. Thus, the angle of the louvers 14 are adjustable by use of an operational mechanism coupled to the control wheel 18. The control wheel 18 has ribs 20 provided therein to prevent a user's thumb or finger from sliding when rotating the control wheel, although the ribs 20 are not required for the present invention.

A rear set of vanes 26 are pivotally mounted to the frame 12 at pivot points 28. The rear vanes 26 are located in a separate plane and extend vertically and perpendicularly to the louvers 14, however, it should be understood that the rear vanes 26 could be oriented in any direction without falling beyond the spirit and scope of the present invention. A second control knob 22 is provided for controlling the rear set of vanes 26. The control knob 22 may also be provided with ribs 23.

The air vent assembly 10 is configured to be installed in an instrument panel, in a typical fashion, such that the vent assembly 10 is approximately at a vehicle occupant's chest level. However, it is also contemplated that the air vent assembly 10 could be provided in other parts of a motor vehicle, such as in an A, B, or C pillar, in a center console, or in a headliner. Further, it is also contemplated that the adjustable air vent assembly 10 described herein has utility in other types of vehicles, such as aircraft, watercraft, trains, and other forms of transportation. Further still, it is contemplated that the present air vent assembly 10 has utility in non-vehicle applications, such as in commercial and residential buildings.

In a motor vehicle application, conditioned air, such as cooled air, heated air, humidified air, or dehumidified air, enters a rear side 24 of the air vent assembly 10. The rear side 24 is typically in fluid communication with the vehicle heating, ventilation, and air conditioning (HVAC) system. The air travels through the conduit portion 30 of the air vent assembly 10 and flows through the plurality of louvers 14 when the louvers 14 are not in the closed position.

Figure 4:
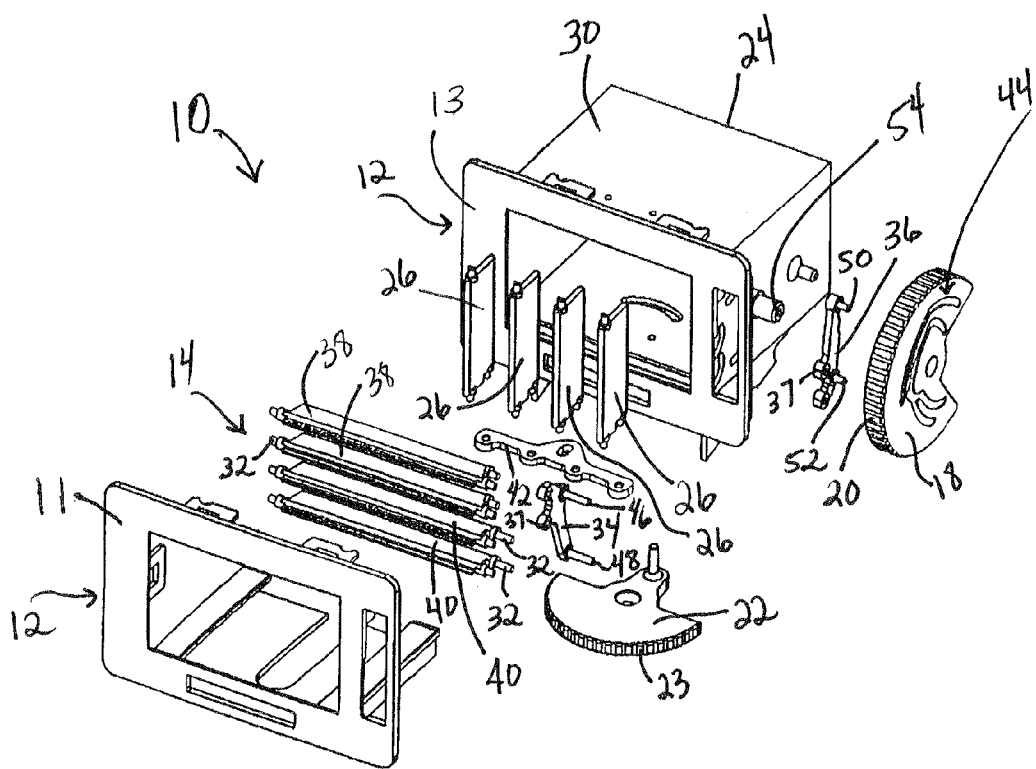
FIG. 4 is an exploded view of the adjustable air vent assembly of FIGS. 1-3.

Referring now to FIG. 4, the individual parts of the air vent assembly 10 may be seen more clearly. In this view a front portion 11 of frame 12 is shown exploded away from a rear portion 13 of frame 12; however, it should be understood that the front and rear portions 11, 13 could be unitarily formed, if desired. Each louver 14 has pin-shaped end points 32, so that each louver 14 may pivot on the pivot points 16. Two links 34, 36 are provided to couple the louvers 14 to the control wheel 18. The links 34, 36 have apertures 37 that slide over the end points 32; the links 34, 36 are secured into place when the louvers 14 are secured to the pivot points 16 (see FIG. 1). It should be understood that any number of links could be used without falling beyond the spirit and scope of the present invention. For example, each louver 14 could have its own link for connection to an actuator, the actuator being the control wheel 18 in this embodiment.

A first link 34 couples a first plurality 38 of louvers 14 to the control wheel 18, and a second link 36 couples a second plurality 40 of louvers 14 to the control wheel 18. Because the first plurality 38 of louvers 14 are coupled to the control wheel 18 separately from the second plurality 40 of louvers 14, it is possible to cause the first plurality 38 of louvers 14 to pivot relative to the second plurality 40 of louvers 14, which will be described in further detail below. In this embodiment, the rear vanes 26 have a single link 42 coupling the rear vanes; in this way, the rear vanes 26 are configured to pivot together.

Figure 9:
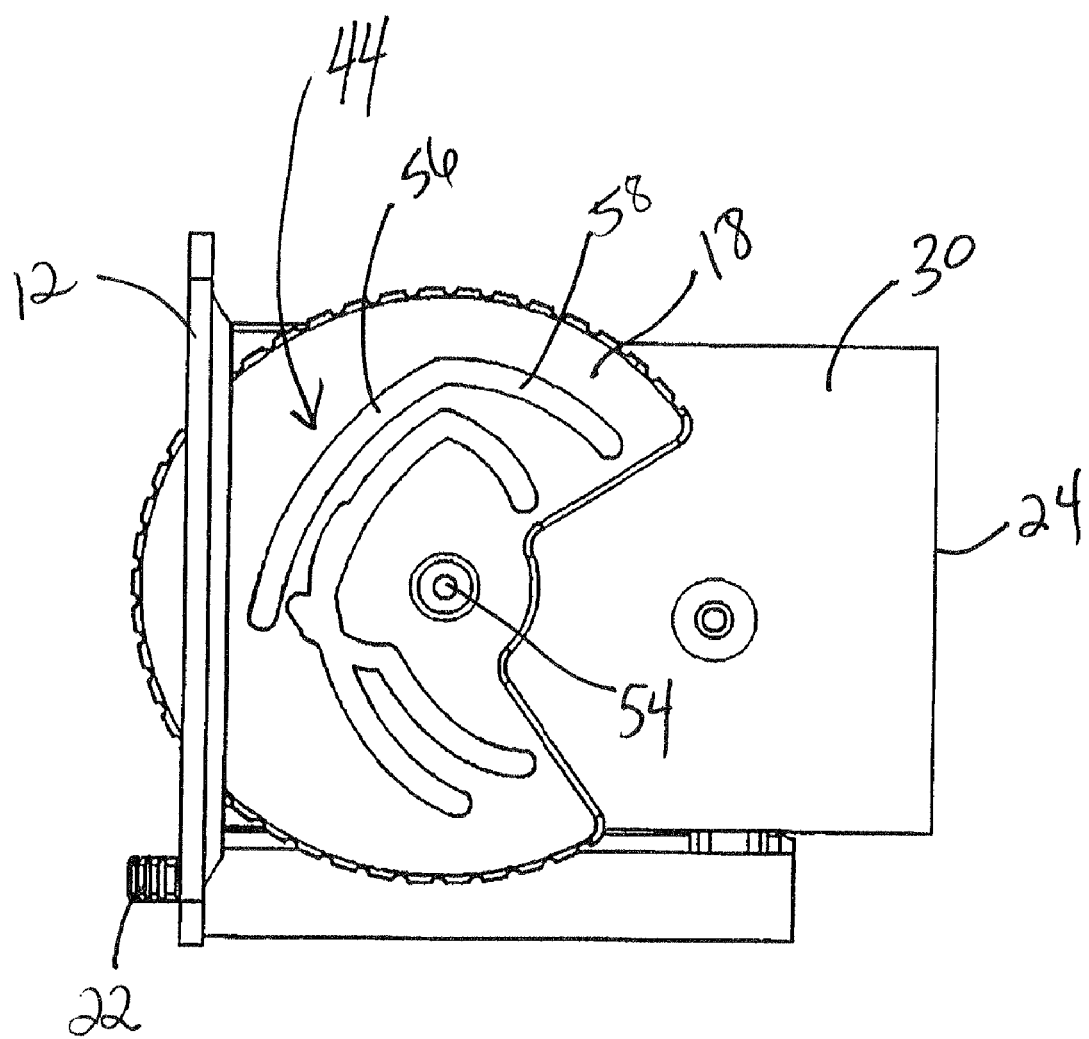
FIG. 9 is a side view of the adjustable air vent assembly of FIGS. 1-8b.

With reference to FIGS. 1, 4, and 9, the control wheel 18 is provided with four channels 44. In the alternative, the control wheel 18 could have any number of channels 44 for different designs. In this embodiment, the first link 34 has a first protrusion 46 and a second protrusion 48; likewise, the second link 36 has a first protrusion 50 and a second protrusion 52. It should be understood, that each link 34, 36 need not have two protrusions 46, 48, 50, 52; each link 34, 36 could have one, three, or more protrusions 46, 48, 50, 52, without falling beyond the spirit and scope of the present invention. The protrusions 46, 48, 50, 52 may resemble pins, as depicted in the Figures, or they may have any other suitable configuration. Each protrusion 46, 48, 50, 52 is slidably received within one of the channels 44. In this embodiment, three of the four channels 44 intersect, a configuration which may save space. That is, three channels extend into each other and are in communication with one another. In this embodiment, therefore, one could consider these three intersecting channels as a single, forked, channel. However, it should be understood that the channels could be provided having different patterns than those shown here.

When the control wheel 18 is rotated around the pivot point 54, each protrusion 46, 48, 50, 52 slides along its respective channel 44. Accordingly, the rotation of the control wheel 18 forces the protrusions 46, 48, 50, 52 to translate within the channels 44; in other words, the channels 44 operate as cams and the protrusions 46, 48, 50, 52 operate as cam followers. In turn, the translation of the protrusions 46, 48, 50, 52 causes movement of the links 34, 36 and hence rotation of the louvers 14.

The paths of the channels 44 may be designed to cause the first link 34 to pivot separately from the second link 36. Because the first link 34 is coupled to the first plurality 38 of louvers 14, and the second link 36 is coupled to the second plurality 40 of louvers 14, the first and second plurality of louvers 38, 40 also pivot separately from one another, resulting in a diffuse position of the louvers 14, wherein the louvers 14 of the first plurality 38 are oriented along a plane that is not parallel to the plane of the louvers 14 of the second plurality 40. The orientation of each louver 14 within the first plurality 38 may vary from louver to louver, and likewise the orientation of each louver 14 within the second plurality 40 may vary from louver to louver, but generally the first plurality 38 and second plurality 40 are oriented in different directions in the diffuse position to provide a diffuse air flow.

Further, the channels 44 may be designed such that, although the first and second links 34, 36 pivot separately from one another, the movement of the protrusions 46, 48, 50, 52 within the channels 44 will still cause the links 34, 36 to move together. In the present embodiment, each channel 44 has two portions 56, 58, which are labeled on only one channel 44, for clarity. When the protrusions 46, 48, 50, 52 slide along the first portions 56 of their respective channels 44, each of the links 34, 36 moves together, but when the protrusions 46, 48, 50, 52 slide along the second portions 58 of their respective channels 44, the first and second links 34, 36 move separately from each other, causing the louvers 14 that are attached thereto to also move separately. While the channels 44 have been described as having first and second portions, these portions can be formed as discrete channels. Further, it is also possible to eliminate the links and directly connect the louvers 14 to the actuator wheel 18, wherein the channels 44 would be structured to provide the open, closed and diffuse positions.

The path provided for each channel 44 depends on the size and shape of the control wheel 18, the location and desired path of the protrusions 46, 48, 50, 52, and the location of the pivot point 54 of the control wheel 18. Further, the path that each channel 44 takes will dictate the timing of the diffusion. In the configuration illustrated, the protrusions 46, 48, 50, 52 reach the diffusion portions 58 of the channels 44 after about a ¾ turn of the control wheel 18.

Figure 5A:
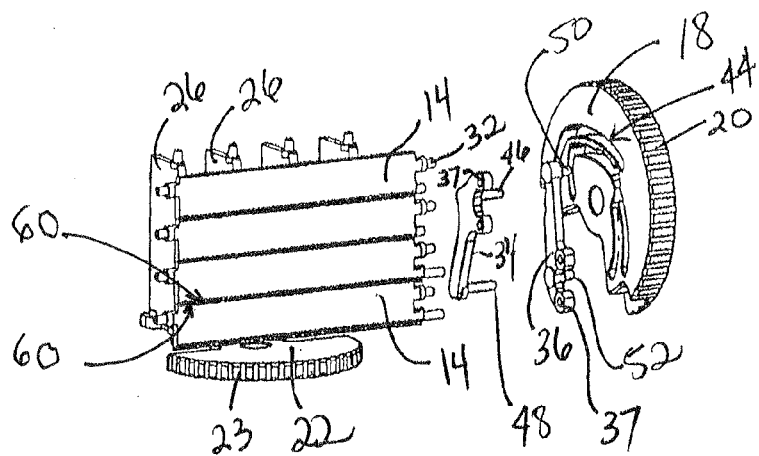
FIG. 5a is a partially exploded view of portions of the adjustable air vent assembly of FIGS. 1-4, showing a plurality of louvers in a closed position.
Figure 5B:
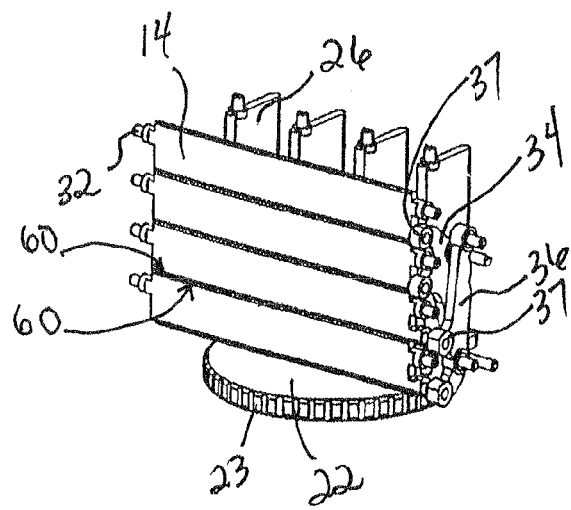
FIG. 5b is a perspective view of portions of the adjustable air vent assembly of FIGS. 1-5a, also showing the plurality of louvers in the closed position.
Figure 7A:
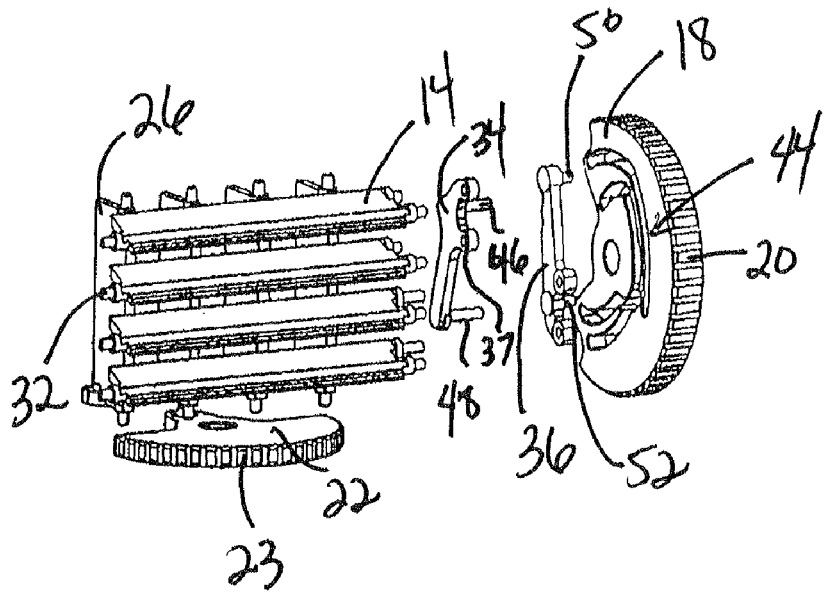
FIG. 7a is a partially exploded view of portions of the adjustable air vent assembly of FIGS. 1-6b, showing the plurality of louvers in a downward-facing, open position.
Figure 7B:
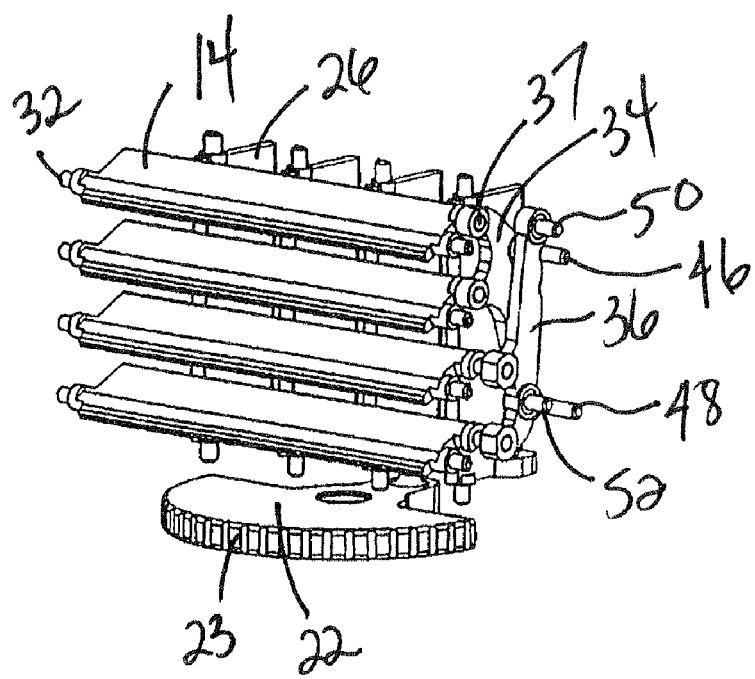
FIG. 7b is a perspective view of portions of the adjustable air vent assembly of FIGS. 1-7a, also showing the plurality of louvers in the downward-facing, open position.
Figure 8A:
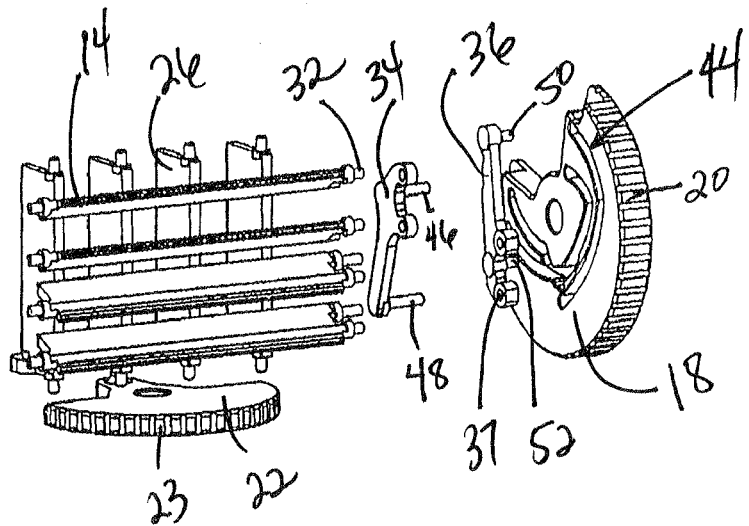
FIG. 8a is a partially exploded view of portions of the adjustable air vent assembly of FIGS. 1-7b, showing the plurality of louvers in a diffuse position.
Figure 8B:
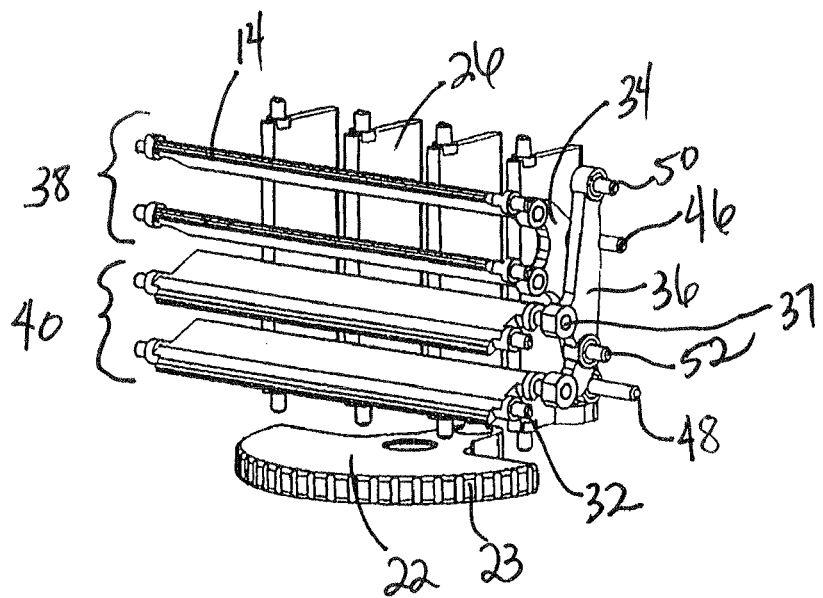
FIG. 8b is a perspective view of portions of the adjustable air vent assembly of FIGS. 1-8a, also showing the plurality of louvers in the diffuse position.

Thus, the louvers 14 are configured to move between three positions: a closed position (see FIGS. 5a-5b), an open position (see FIGS. 6a-7b), and a diffuse position (see FIGS. 8a-8b). With reference to FIGS. 5a-5b, in the closed position, the edges 60 of the louvers contact each other to prevent air from passing through the plurality of louvers 14.

Figure 6A:
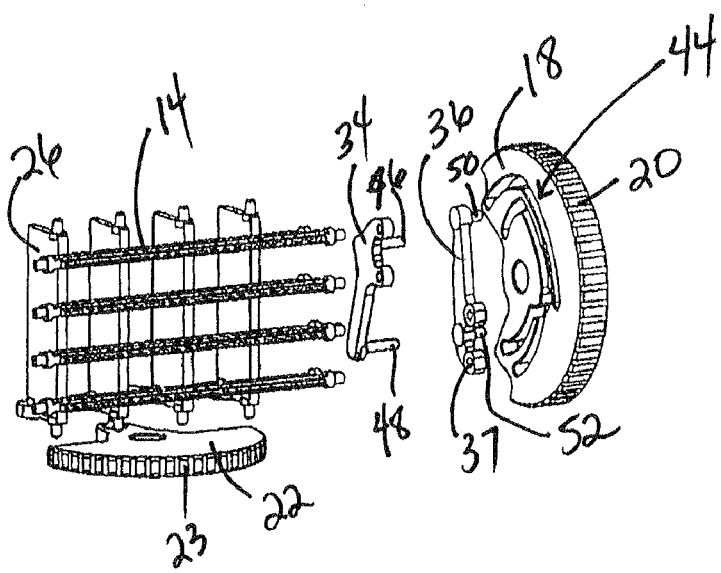
FIG. 6a is a partially exploded view of portions of the adjustable air vent assembly of FIGS. 1-5b, showing the plurality of louvers in a straight, open position.
Figure 6B:
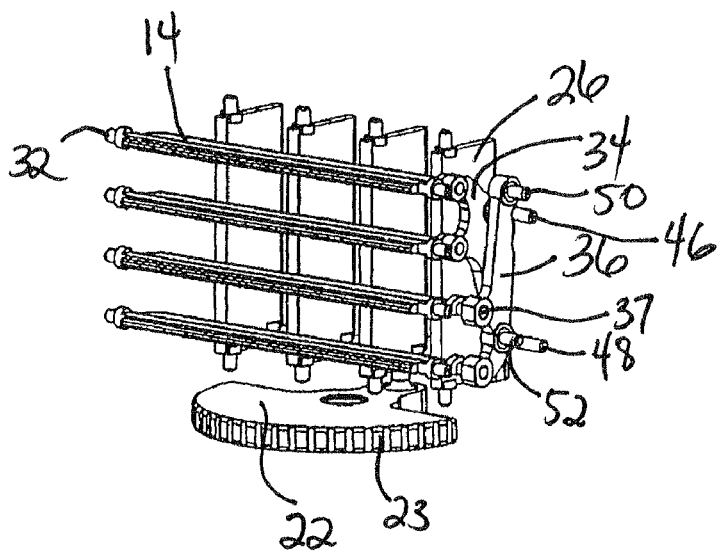
FIG. 6b is a perspective view of portions of the adjustable air vent assembly of FIGS. 1-6a, also showing the plurality of louvers in the straight, open position.

With reference to FIGS. 6a-6b, the plurality of louvers 14 is shown in a straight open position. In this position, each protrusion 46, 48, 50, 52 is near the mid-point between the two portions 56, 58 of each of their respective channels. With reference to FIGS. 7a-7b, the plurality of louvers 14 is shown in the open position, but it is a downward open position that occurs as the protrusions 46, 48, 50, 52 move further along the channels 44 to the junction between the first and second portions 56, 58 of each channel 44. The louvers 14 of FIGS. 7a-7b are in a downward-facing position to direct air to pass therethrough at an angle in a downward direction. Of course, any angle of air flow can be obtained through adjustment of the louvers 14 via the control wheel 18. Thus, it can be seen that the air vent assembly 10 has utility as an ordinary register vent that may be adjusted to change the direction of the air flow.

Now with reference to FIGS. 8a-8b, the plurality of louvers 14 is shown in the diffuse position. As shown in FIGS. 8a-8b, the protrusions 46, 48, 50, 52 are at the end of their rotational range in the channels 44, along the diffusion portion 58 of the channel 44. When the protrusions 46, 48, 50, 52 are located in the diffuse position 58, the first plurality 38 of louvers 14 is oriented in an upward position and a second plurality 40 of louvers 14 is oriented in a downward position. In other words, after the louvers 14 point in a downward direction, the first plurality 38 of louvers 14 then moves into an upward-facing direction in the diffuse position. Thus, the first plurality 38 of louvers 14 is oriented on a plane not parallel with the plane of the second plurality 40 of louvers 14. In this embodiment the louvers 14 of the first plurality 38 are, however, generally parallel to each other. Likewise, the louvers 14 of the second plurality 40 are generally parallel to each other. It should be understood that this need not be the case, as each louver 14 could be coupled to its own separate link 34, 36 or otherwise arranged to have some variation, as noted above.

In the diffuse position, the air flow through the louvers 14 experiences an increased oscillatory flow, or more turbulence in the air flow, due to increasing the exit angle of the air, and providing multiple exit angles in different directions. Such additional turbulence may cause the surrounding air to mix more readily with the conditioned air being forced from the vent assembly 10. As one would contemplate, such mixture would likely provide more comfort, as hot and cold spots are reduced. Diffuse air flow may also provide conditioned air in a more gentle air stream that does not directly blow on an occupant.

Although the rear vanes 26 are shown in the figures as being coupled to a single link 42, and thus, operative to rotate together, it should be understood that the rear vanes 26 could be coupled to at least two separate links, similarly to the louvers 14, to provide a diffuse position for the rear vanes 26. Furthermore, although the rear vanes are shown as being controllable via the separate wheel 22, it should be understood, that the rear vanes could be controlled by the control wheel 18, by coupling the link 42 that moves the rear vanes 26 to the control wheel 18. For example, the link 42 could have its own channel 44 in the control wheel 18, or the link 42 could have a channel in another wheel or cam that is coupled to the control wheel 18. It should also be understood that although wheels 18, 22 are shown as controlling the movement of the louvers 14 and vanes 26, any other suitable actuator could be used without falling beyond the spirit and scope of the present invention. The actuator is a single actuator that is operable to move multiple louvers 14 simultaneously, rather than an actuator that moves each louver 14 individually.

Referring now to FIGS. 10-12, another air vent assembly is illustrated and designated generally at 110. Like the air vent assembly 10 of FIGS. 1-9, the air vent assembly 110 of FIGS. 10-12 has a frame 112 to which a plurality of louvers 114 are pivotally mounted. The louvers 114 have pin-shaped end points 132 to facilitate the pivotal mounting thereof. The air vent assembly 110 has a conduit portion 130 through which air is directed from a vehicle HVAC system and out through the plurality of louvers 114. Instead of a control wheel 18, the actuator 118 of the present air vent assembly 110 is a protrusion or knob that is directly attached to a louver 114.

With reference to FIG. 12, each of the three middle louvers 114B, 114C, 114D has a cam 170 and a protrusion 172. Each of the protrusions 172 and cams 170 are rigidly attached to a louver 114; however it is contemplated that the cam 170 and protrusion 172 could be attached in a manner that is not rigid, without falling beyond the spirit and scope of the present invention. A top end louver 114A has a protrusion 172, but not a cam 170. A bottom end louver 114E has a cam 170, but not a protrusion 172.

Figure 13B:
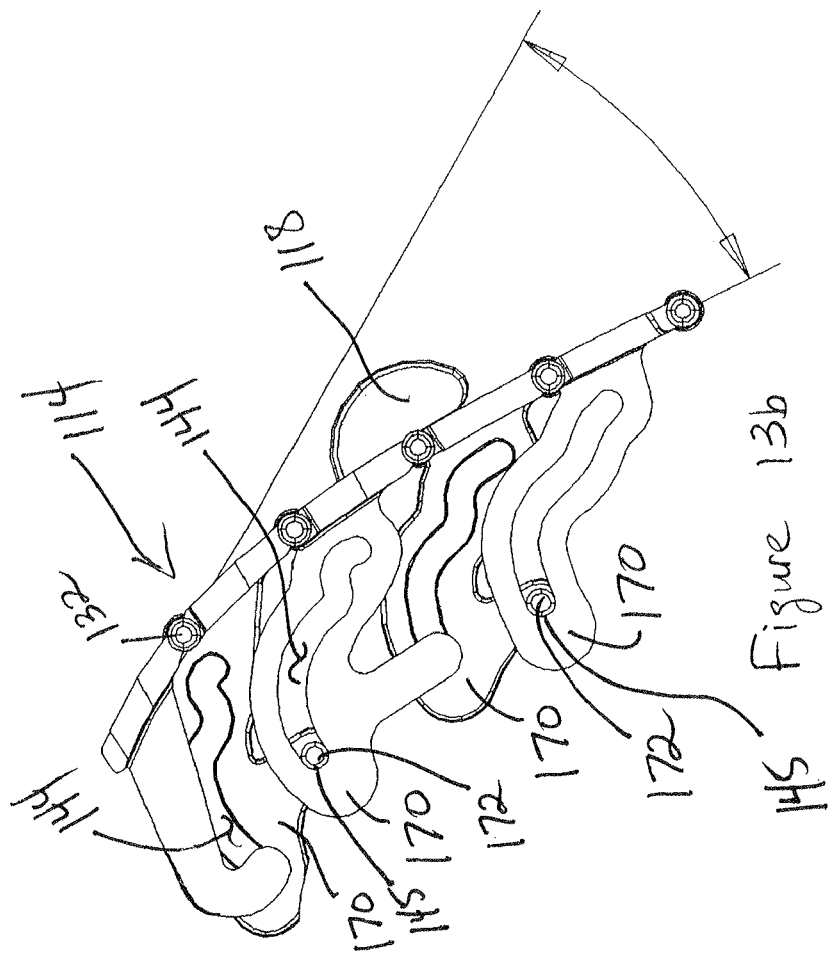
FIG. 13b is a side view of portions of the adjustable air vent assembly of FIGS. 10-13a, also showing the plurality of louvers in the closed position.
Figure 13A:
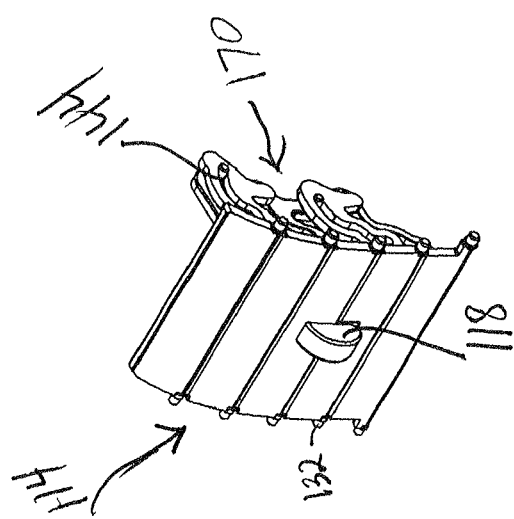
FIG. 13a is a perspective view of portions of the adjustable air vent assembly of FIGS. 10-12, showing a plurality of louvers in a closed position.

With reference to FIGS. 13a-13b, each of the louvers 114A-114E is slidably connected together by virtue of the protrusions 172 and cams 170. More specifically, each cam 170 has a channel 144 in which a protrusion 172 is slidably received. In this embodiment, the protrusions 172 extend from the cams 170. The protrusions 172 alternate the sides of the cams 170 from which they protrude. In other words, the lower-most protrusion 172 shown in FIG. 13b is oriented in a direction out-of-the-page, and the next protrusion upward cannot be seen because it is directed into a channel 144 in a direction into-the-page, then the next protrusion is oriented out-of-the-page; the alternating pattern continues throughout the assembly. In the alternative, the protrusions 172 could all project in the same direction, or they could alternate with a different pattern.

In FIGS. 13a-13b, the louvers 114 are shown in a closed position. Each louver 114 lays edge-to-edge with the louver 114 next to it, to substantially prevent air from flowing through the plurality of louvers 114. The protrusions 172 are each located at a first end 145 of each channel in each cam 170.

Figure 14B:
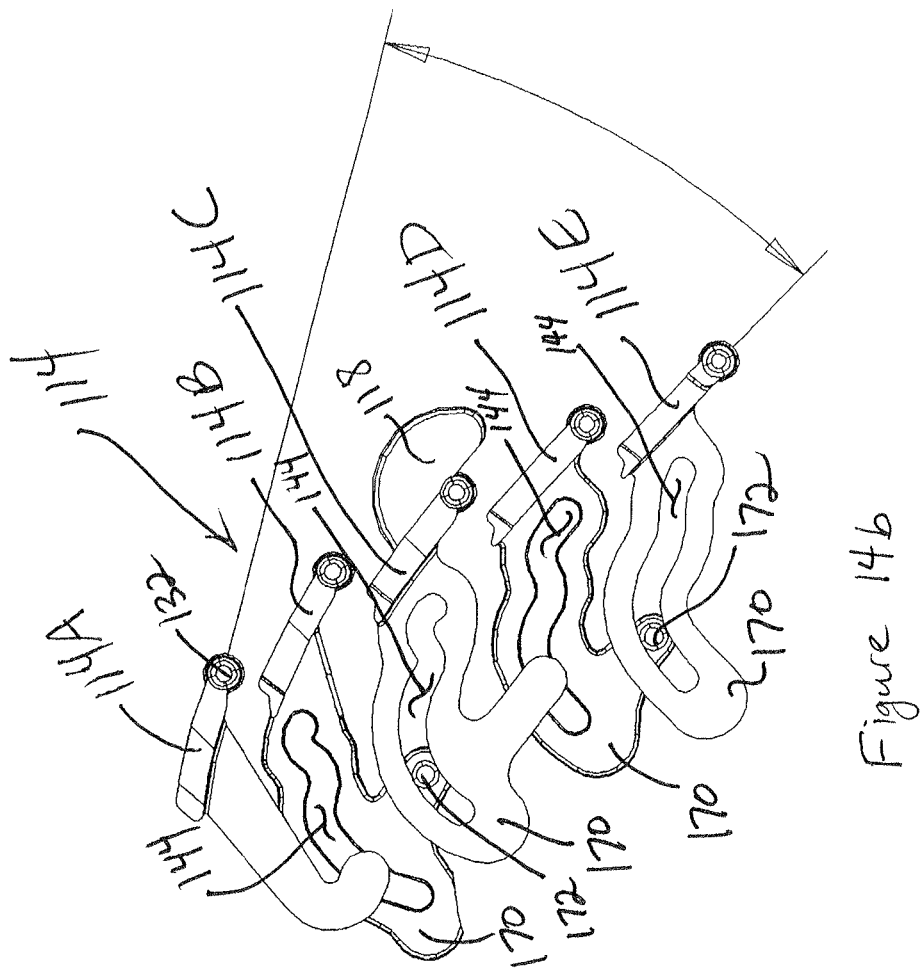
FIG. 14b is a side view of portions of the adjustable air vent assembly of FIGS. 10-14a, also showing the plurality of louvers in the slightly open, diffuse position.
Figure 14A:
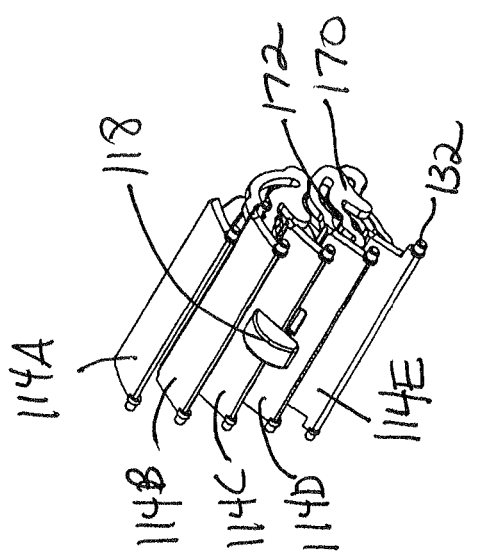
FIG. 14a is a perspective view of portions of the adjustable air vent assembly of FIGS. 10-13b, showing the plurality of louvers in a slightly open, diffuse position.

Referring now to FIGS. 14a-14b, the louvers 114 are shown in a slightly open position. To move the louvers 114 into this slightly open position, a user pushes inward, as shown in FIGS. 14*a*-14*b*, moving the top of each louver 114 to the left. Although a user is applying a force only to the middle louver 114C using the actuator 118, all of the louvers 114 are pivoted because they are each slidably coupled together. The protrusion 172 of the first louver 114A is slidably received into the channel 144 of the cam 170 of the second louver 114B, the protrusion 172 of the second louver 114B is slidably received into the channel 144 of the cam 170 of the middle louver 114C, and so on. Each protrusion 172 slides along a channel 114 of a cam 170 to move each louver 114. In this embodiment, the slightly open position is a slightly diffuse position, as the louvers 114 are not completely parallel to each other. The farther the louvers 114 open, the further they move away from parallel.

As the actuator 118 is further moved, the louvers 114 open further and the diffusion angle increases. In other words, the angles between the planes on which the louvers 114 are located increase. With reference to FIGS. 15*a*-15*b*, the louvers 114 are in the fully diffuse position. The middle louver 114C defines a straight axis X, and it can be seen that the louvers 114A, 114B located above the axis X are oriented upward, while the louvers 114D, 114E located below the axis X are oriented downward.

In an alternative embodiment, the air vent assembly 110 could be configured such that the louvers 114 move between an open position, in which the louvers 114 are substantially parallel to each other, and a closed position, in which the louvers 114 contact each other to block air flow.

The louvers 114 of FIGS. 10-15*b* form a link-less air vent assembly 110. There is no link necessary to couple each louver 114 together; rather, each louver 114 is slidably coupled to the louver 114 adjacent to it by virtue of a protrusion 172, such as a pin, being received within a channel 144 formed in a rigidly connected cam 170. Since the louvers 114 are merely slidably coupled to each other, the louvers 114 are able to pivot relative to each other to form a diffuse position. The paths of the channels 144 can be varied to cause the louvers 114 to reach a more or less diffuse position. In other words, by changing the paths of the channels 144, the angle by which louver 114 deviates from the angle of each other louver 114 may be increased or decreased.

Numerous variations of the air vent assemblies 10, 110 are contemplated, including, but not limited to front louvers 14, 114 that open at the bottom, front louvers 14, 114 that do not have a closed position, allowing rear vane 26 diffusion without allowing front louver 14, 114 diffusion, simultaneous front and rear diffusion, electromechanically operated vanes 26 and louvers 14, 114, pushbutton operation of the diffusion operation, slider operation of the diffusion, and non-cam operation of the vanes for diffusion.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

We claim:

1. An adjustable air vent assembly comprising:
   a frame;
   a plurality of louvers pivotally mounted to the frame;
   the plurality of louvers being movable between a closed position and a diffuse position, each louver of the plurality of louvers having an edge contacting an edge of at least one other louver of the plurality of louvers in the closed position to substantially prevent air from flowing through the plurality of louvers in the closed position, a first louver of the plurality of louvers being oriented along a non-parallel plane with respect to a second louver of the plurality of louvers in the diffuse position; and
   an actuator coupled to the plurality of louvers for moving the plurality of louvers between the closed and diffuse positions;
   wherein the adjustable air vent assembly further comprises:
   a first protrusion coupled to the first louver;
   a second protrusion coupled to the second louver;
   a first channel, the first protrusion being slidably received within the first channel; and
   a second channel, the second protrusion being slidably received within the second channel,
   a third protrusion coupled to the first louver;
   a fourth protrusion coupled to the second louver;
   a third channel formed in the single control wheel, the third protrusion being slidably received within the third channel; and
   a fourth channel formed in the single control wheel, the fourth protrusion being slidably received within the fourth channel;
   the first and second protrusions being configured to move along each of the first and second channels upon actuation of the actuator, the first and second channels each having diffuse portions defining paths structured to cause the first and second louvers to pivot relative to each other when the first and second protrusions are moved along the diffuse portions of the first and second channels, and wherein the first and second channels are formed in a control wheel.

2. The adjustable air vent assembly of claim 1, at least one of the first, second, third, and fourth channels intersecting at least one other of the first, second, third, and fourth channels.

3. The adjustable air vent assembly of claim 1, the first and second louvers being further movable to an open position, each louver of the plurality of louvers being oriented along generally parallel planes with respect to each other and being open to allow air to flow through the plurality of louvers in the open position.

4. The adjustable air vent assembly of claim 1, a third louver of the plurality of louvers being coupled to the first louver such that the first and third louvers pivot together when moved between the closed and diffuse positions, and a fourth louver of the plurality of louvers being coupled to the second louver such that the second and fourth louvers pivot together when moved between the closed and diffuse positions.

5. The adjustable air vent assembly of claim 1, further comprising a rear set of vanes disposed at a rear side of the plurality of louvers and being oriented generally perpendicular to the plurality of louvers, the rear set of vanes being pivotally attached to the frame, the rear set of vanes being movable by actuation of one of the control wheel and a separate control wheel.

6. The adjustable air vent assembly of claim 5, the rear set of vanes being movable between a diffuse position and an open position, each vane of the rear set of vanes being oriented along a generally parallel plane with respect to each other vane in the open position, a first vane of the rear set of vanes being oriented along a non-parallel plane with respect to a second vane of the rear set of vanes in the diffuse position, the rear set of vanes being oriented to allow air to flow through the rear set of vanes in both the open and diffuse positions.

7. The adjustable air vent assembly of claim 1, further comprising:

a first link, the first and third protrusions being integrally formed with the first link, the first link being pivotally connected to the first louver; and a second link, the second and fourth protrusions being integrally formed with the second link, the second link being pivotally connected to the second louver, the first and second links being movable relative to each other.

* * * * *